Feb. 17, 1970   F. M. MANN, JR., ET AL   3,495,720
SUSPENDED CONVEYOR TROLLEY HANDLING DEVICE
Filed April 19, 1966   7 Sheets-Sheet 2

United States Patent Office 3,495,720
Patented Feb. 17, 1970

3,495,720
SUSPENDED CONVEYOR TROLLEY HANDLING DEVICE
Freeman M. Mann, Jr., and James H. Carpenter, Jr., Hagerstown, Md., assignors to The Carborundum Company, Niagara Falls, N.Y., a corporation of Delaware
Filed Apr. 19, 1966, Ser. No. 543,616
Int. Cl. B61b 3/02; B24c 3/08
U.S. Cl. 214—1
16 Claims

ABSTRACT OF THE DISCLOSURE

A movably supported trolley includes workpiece engaging means for holding an article to be treated and also includes a drive for moving the trolley independently of any other trolley in and around the treating area for the workpiece.

---

This invention relates to a system for conveying a workpiece to a treating area, particularly to such an area where the workpiece is cleaned by means of abrasive blasting.

Present blast cleaning systems utilize a turnstile arrangement or a monorail from which a series of workpiece holders are moved into, through, and out of the blast cleaning area. These conventional systems have a number of serious disadvantages or limitations. For example, in such systems a drive chain is guided by the monorail track and is connected to and thus moves the work supporting hooks. This arrangement causes all hooks in the system to drive in the same pattern at the same time. The drive chain is usually driven with a two speed drive in order to speed up production. The fast speed is used to index the hooks from one station to another (for instance load, unload, blast, etc.) and the slow speed is used to move the hook slowly in front of the blasting wheel. This means that the loading and unloading of the workpieces from the hooks must be accomplished while the hooks are moving. This is so because stopping the drive chain for loading and unloading would cut down production since no other necessary function could take place at the same time.

Another limitation of prior systems results from the necessity of maintaining clearances in the drive chain. These clearances in addition to the type of suspension of the hook from the trolley results in the hooks being relatively free to swing. This disadvantage is not particularly great where the workpiece is heavy and the blast pressure is light (from low horsepower wheels) or where exact positioning in front of the blast wheel is unimportant. However, many modern applications require high horsepower blasting of small parts. This blasting cannot be accurately done unless a rigid non-swaying hook is utilized.

In prior systems work hooks are rotated about their center lines in the blast cabinet to expose all surfaces of the workpiece to the blast stream. However, the work angle in relationship to blast or the monorail travel direction is uncontrollable. Additionally, the hooks are freely rotating outside of the blast cabinet. These features thus make it extremely difficult to utilize automatic loading and unloading equipment which would normally require precise orientation of the work as well as a rigid non-swaying work hook and precise stopping at the load or unload stations.

A further disadvantage of the prior systems is that these systems do not lend themselves to the incorporation of automatically controlled doors at each end of the blast cabinet. This is so because the workpieces are too close together to accurately control the opening and closing of the doors. Moreover, since the workpieces are so close together, the workpiece might become damaged by being contacted by the doors as the doors are being closed. As a result, prior systems generally use rubber flap-type doors at each end of the blast cabinet. These flap-type doors are not efficient in confining abrasive and flying debris. The rubber flaps also prevent operation in extreme temperature conditions since the flap material might be adversely affected.

An object of this invention is to provide improved workpiece conveying systems which overcome the above disadvantages.

A further object is to provide such a system which increases the flexibility and capability of monorail and turnstile type blast cleaning machines by making them adaptable to higher speeds, greater work capacity, more precise control of the work being done, and automatic loading and unloading of the workpiece.

Novel features and advantages of the present invention will become apparent to one skilled in the art from a reading of the following description in conjunction with the accompanying drawings wherein similar reference characters refer to similar parts and in which.

Figure 1:
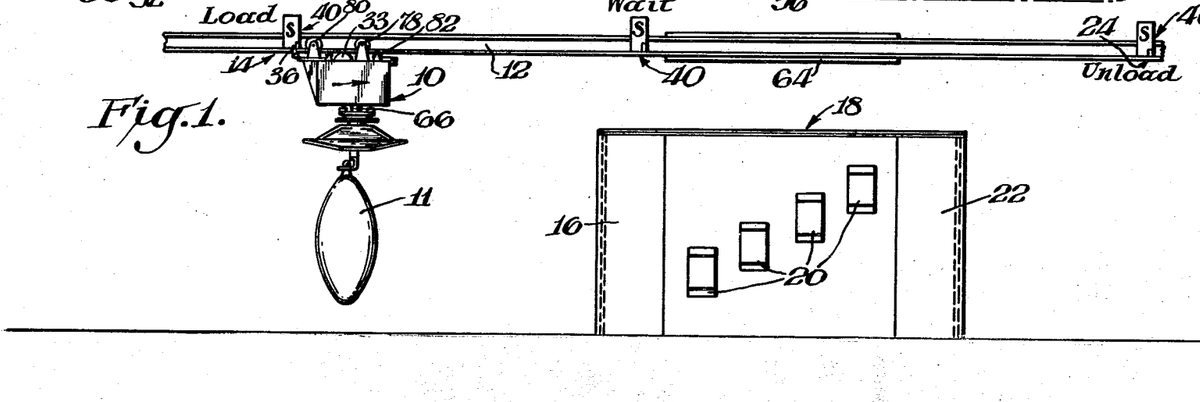
FIG. 1 is a schematic view in elevation of one embodiment of this invention.

FIG. 1 schematically illustrates some of the versatility afforded by the use of individually driven trolleys in accordance with this invention. As indicated therein trolley 10 is supported on monorail 12. The trolley can be held stationary at a load station 14 where workpiece 11 may be automatically loaded thereon. Subsequently, the trolley can be driven to a vestibule 16 of treating area 18, and can dwell in that station until it is ready to enter the treating area for treatment by for example a plurality of blast wheels 20. Since the trolleys are independently driven, a series of the trolleys can be accumulated and can dwell outside of the blast area. After treatment of its workpiece the trolley can exit through vestibule 22 and can dwell at unload station 24 where the workpiece 11 can be unloaded.

Figures 2, 3, 4A:
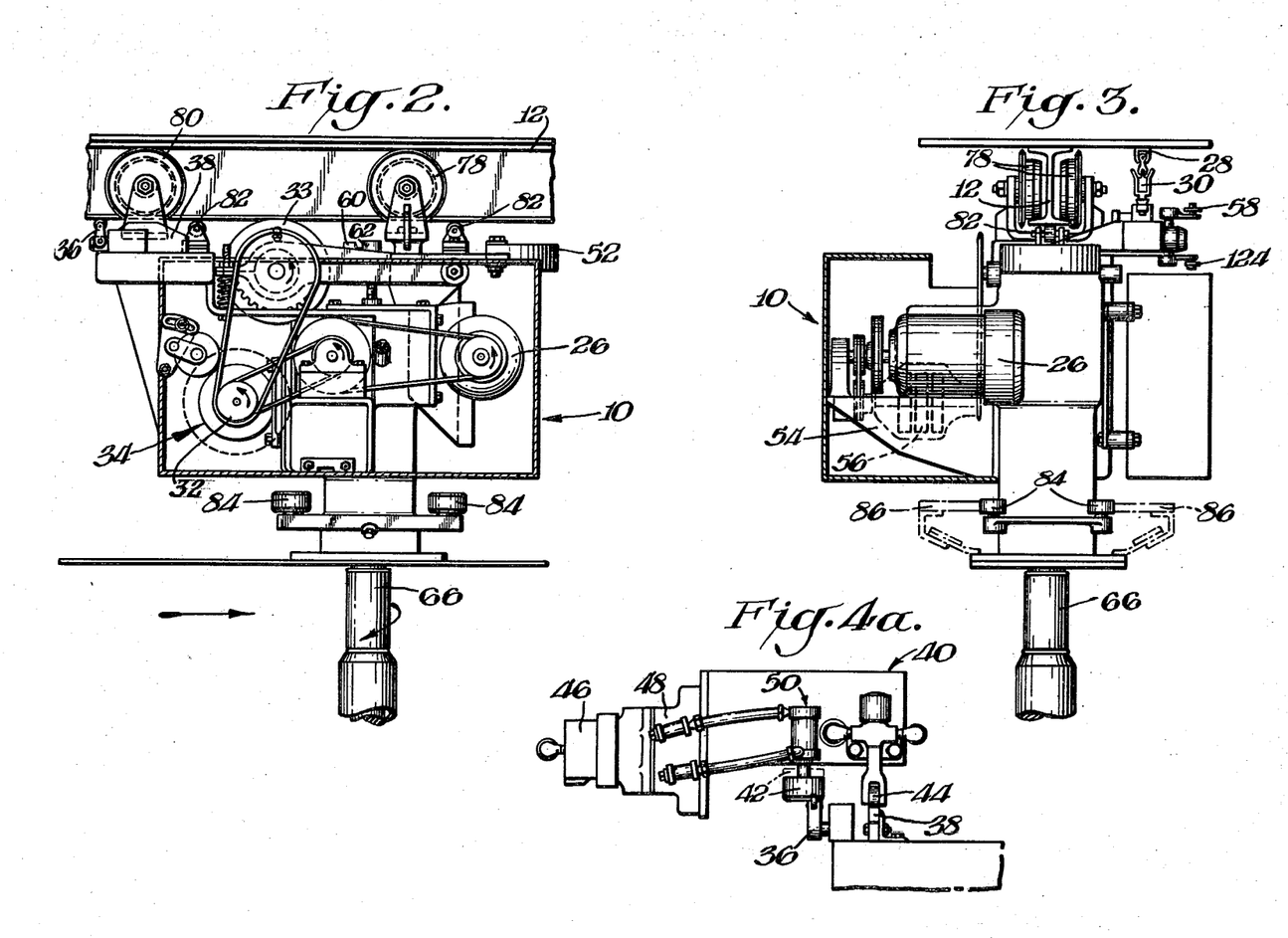
FIG. 2 is a side view in elevation of a self-motorized trolley used in the embodiment of this invention shown in FIG. 1.
FIGS. 3–4 are front and plan views respectively of the motorized trolley shown in FIG. 2.
FIG. 4a is a side view in elevation of a stop mechanism for the motorized trolley shown in FIGS. 2–4.

FIGS. 2–3 show an advantageous manner of individually driving and controlling trolley 10. As indicated therein, trolley 10 includes a continuously running drive motor 26 which receives its power from the bus bar system 28 (FIG. 3) through collectors 30. Drive motor 26 powers a translatory movement control system and a rotational movement control system. The translatory movement control system includes forward motion clutch 32, forward motion brake 34, switch 36, cam 38 and retractable stop mechanism 40 (FIG. 4a). Switch 36 controls the activation and deactivation of clutch 32 and brake 34 with respect to motor 26. When clutch 32 is engaged trolley 10 is powered in the forward direction by driving wheel 33 against monorail track 12. Trolley 10 proceeds along the monorail track 12 until approaching a load, unload, wait or blast station. Retractable stop mechanism 40 is disposed at each of these stations, to stop the forward translatory movement of trolley 10. When switch 36 on trolley 10 strikes normally extended stop 42 (as shown in full lines in FIG. 4a), the switch 36 is actuated to disengage clutch 32 and engage brake 34. This stops the forward movement of trolley 10. At the same time valve control cam 38 on trolley 10 contacts and operates valve 44 to start timer 46. At the end of a preset time, valve 48 energizes cylinder 50 to retract stop 42 as shown in phantom in FIG. 4a. Micro-switch 36 is thus released to disengage brake 34 and re-engage clutch 32 so that the trolley can proceed to the next dwell station.

A safety feature of trolley 10 is the inclusion of a bumper control mechanism. This includes tape switch 52 (FIG. 4) disposed at the forward end of the trolley. As trolley 10 approaches a preceding trolley which is stationary on track 12, switch 52 will contact the preceding trolley to disengage clutch 32 and engage brake 34 thus causing trolley 10 to halt its forward movement. This permits a plurality of trolleys to be automatically stopped at a dwell station until the next station is clear. Trolley 10 thereby remains stopped as long as contact is maintained between switch 52 and the preceding trolley. This is in striking contrast to prior arrangements which must maintain a fixed spacing between trolleys. When contact is broken by the preceding trolley moving ahead, switch 52 causes brake 34 to be disengaged and clutch 32 to be engaged to automatically being the forward movement of trolley 10.

Figure 4:
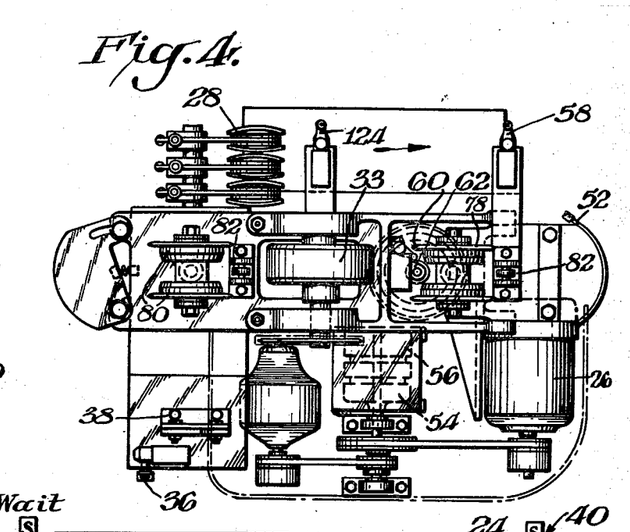

Drive motor 26 also powers a rotational movement control system which includes clutch 54, brake 56, switch 58, switch 60, preset cam 62, and a cam 64 (FIG. 1) in the treating area for actuating switch 58 (FIG. 4). As trolley 10 moves between stations work hook 66 does not rotate. At certain stations, such as in treating area 18, switch 58 rides on cam 64 to disengage brake 56 and engage clutch 54 to motor 26 to cause work hook 66 to rotate along with its workpiece 11. Cam 64 extends, for example, the entire length of the treating area so that the rotation occurs throughout the treating area. For purposes of automatic loading and unloading it is highly desirable that work hook 66 stop its rotation at a predetermined position so that, for example, the article receiving means of the work hook will always face the automatic loading and unloading equipment. The stopping of rotation at this preselected position is assured by preset switch and cam 60, 62 respectively (FIG. 4). When switch 58 runs off cam 64 at the end of the treating area, clutch 54 remains engaged and work hook 66 continues to rotate. The rotation continues until the work hook 66 and preset cam 62 which is located on and is rotated by the work hook are in the predetermined stopping position whereupon cam 62 actuates preset switch 60 to disengage clutch 54 and to engage brake 56 for then stopping the rotation.

Figure 5:
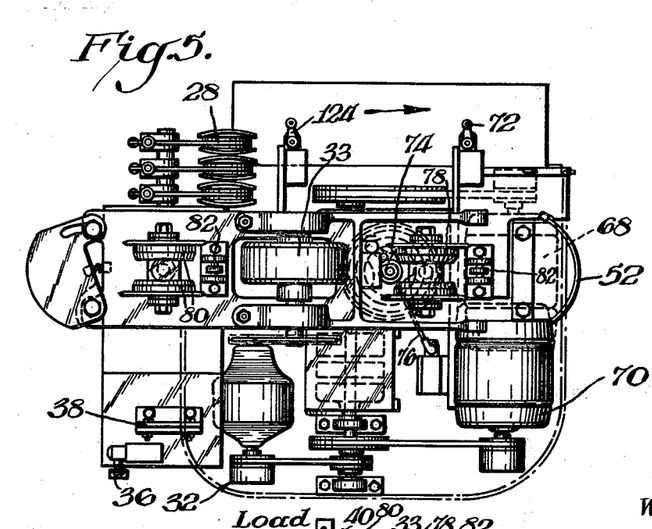
FIG. 5 is a plan view similar to FIG. 4 of a modified trolley in accordance with this invention.

FIG. 5 shows a modified form of the trolley, to provide for multi-speed rotation. In this embodiment the rotation of work hook 66 is accomplished by the engagement of high speed motor 68 or of low speed motor 70. Switch 72 is provided to signal the start of rotation when the switch contacts cam 64 in treating area 18. This causes speed selection cam 74 to rotate. Speed selection switch 76 rides against cam 74 to determine whether high speed motor 68 or low-speed motor 70 will be clutched-in. Additionally, by disposing suitable dwells in cam 74 the work hook can be made to pause (with both motors disengaged) for a portion of a revolution of cam 74. This multi-speed rotation of work hook 66 is particularly advantageous when abrasive cleaning for example, bathtubs or other objects where it is desired to subject one portion of the object to a more thorough cleaning operation. Thus if the interior of the bathtub is to be cleaned to a higher degree it can be rotated in front of the blast wheel at a slower speed or can even pause in front of the blast wheel.

Trolley 10 is constructed in such a manner that work hook 66 is rigidly mounted so that any tendency of the work hook to sway is minimized. This rigid mounting will best be understood by referring to FIGS. 2–3. One feature of the rigid mounting is the provision of a pair of spaced wheels 78, 80 on each side of the monorail track 12. The rollers 82 ride under the monorail track to provide sufficient points of contact that the trolley cannot rotate toward or away from the monorail track. The rigid mounting of work hook 66 is particularly important in the blast treating area. Thus in this area added safeguards are taken such as the provision of a set of rollers 84 immediately above work hook 66. These rollers ride against guide plates 86 (FIG. 3) which are mounted above the blast treating cabinet 18 so that sideward swaying is prevented.

The aforedescribed trolley has a number of important advantages. For example, all hooks do not stand and wait while an operation is being done on one hook. Each hook at the completion of its work at a particular work station will move at high speed to the next station. Additionally, the ability of the hooks to stop and dwell at the load and unload stations, the provision of a rigid work hook, and the accurate stopping of forward motion and of rotation makes possible the use of automatic load and unloading equipment, such as schematically shown at 88, 90 in FIG. 15.

The rigid work hook also permits the application of higher horsepower blasting per hook, thus reducing the time necessary for cleaning and also reducing the overall size of the machine required. Moreover, by full control of the rotation of the work hook such as by two-speed drive indicated in FIG. 5 production can be increased approximately 25% or more, or even as much as 500%. For example, the multi-speed rotation can be utilized so that one-half of one revolution could be at a fast rotational speed and the other half at a slow speed. As indicated above, the advantage of this is that some parts such as a bathtub require heavy blasting on one surface and light blasting on another. By varying the rotational speed, more blast can be applied to the hard-to-clean areas. In addition to this, the rotation can be made to pause in front of blast wheel or blast nozzle. This is thereby another way that more blast can be applied to hard-to-clean spots or areas without wasting time or blast material on the areas which are easier to clean.

Figures 6, 7:
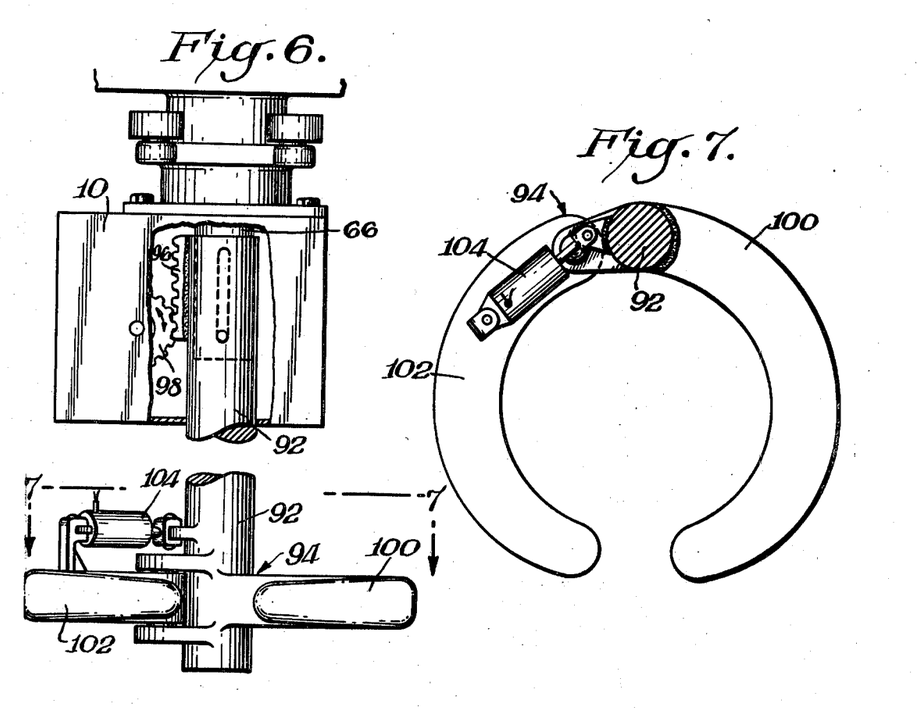
FIG. 6 is an elevational view partially in section of a further trolley in accordance with this invention.
FIG. 7 is a cross sectional view taken through FIG. 6 along the line 7—7.

FIGS. 6–7 illustrate another feature of this invention which adds to the versatility of trolley 10. As indicated in FIG. 6, work hook 66 has a sleeve 92 which telescopes over work hook 66. Sleeve 92 in turn carries the work clamping mechanism 94, while a rack 96 is disposed upon a portion of sleeve 92. Rack 96 is engaged by pinion 98 mounted in trolley 10. Pinion 98 is powered by the same motor mechanism 26 which controls the translatory or rotational movement of trolley 10. By proper manipulation of pinion 98 it is possible to vertically adjust the position of work clamping device 94 as an aid to automatic loading or placement of the work advantageously before a blast wheel.

FIGS. 6-7 also show the details of integral work clamp device 94 which is also advantageously actuated by the power drive 26 already available in the trolley. As most clearly indicated in FIG. 7 the work clamping device 94 includes a stationary clamping arm 100 which is rigidly secured to sleeve 92. Pivotably attached thereto is movable clamping arm 102 which is actuated by electrical solenoid 104 or other electrical or mechanical devices. The clamping mechanism 94 is particularly useful in that during automatic loading and unloading mechanism 94 is controlled in such a manner that the movable clamping arm 102 is open or closed when the clamping arrangement 94 contacts the workpiece at a loading or unloading station.

Figure 8:
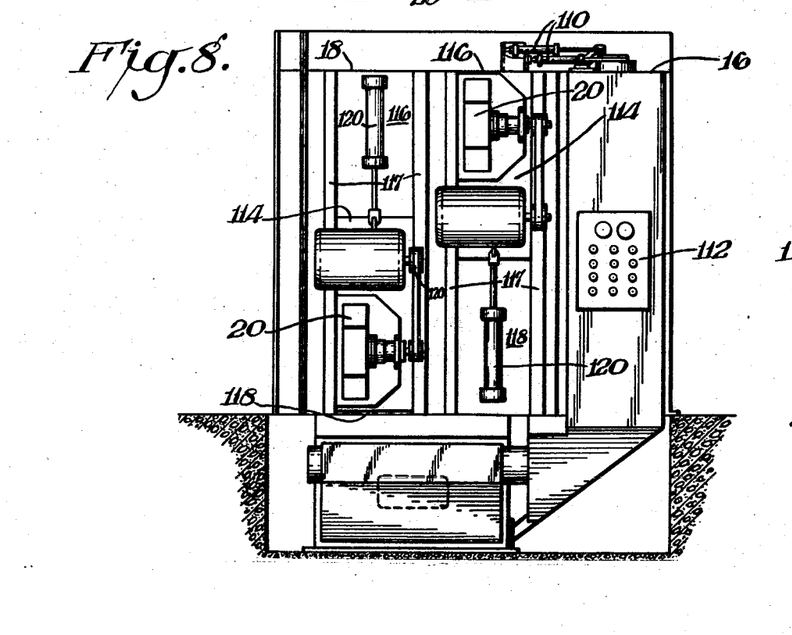
FIG. 8 is a side view of a treating cabinet used in the embodiment of the invention shown in FIG. 1.
Figure 9:
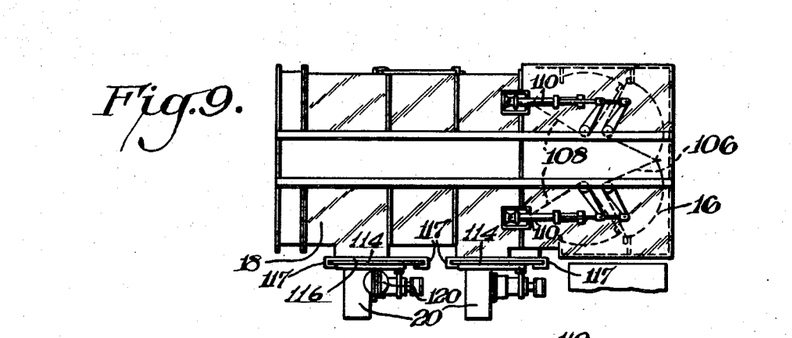
FIGS. 9–10 are plan and end views respectively of the treating cabinet shown in FIG. 8.
Figure 10:
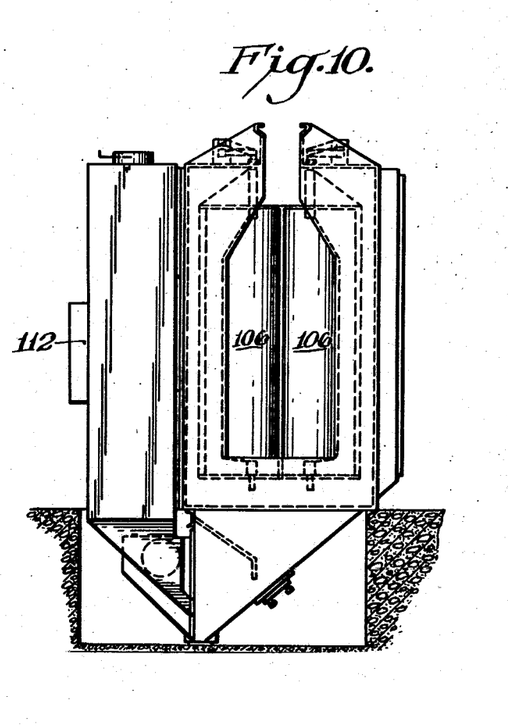
Figure 11:
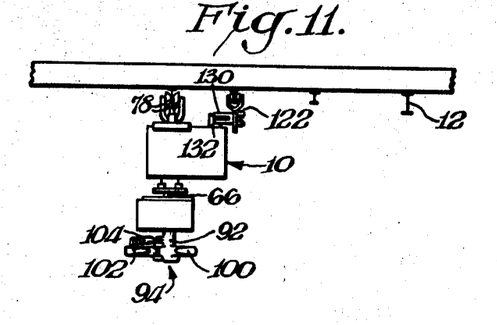
FIG. 11 is an elevational view showing a trolley drag chain arrangement used with a trolley formed in accordance with this invention.

As indicated above the individualized control of each trolley permits the use of automatic doors in the vestibules at each end of a treating area. FIGS. 8-10 indicate one example of such an arrangement. FIG. 9 shows vestibule 16 at the entrance to the blast cleaning area 18. Vestibule 16 is similar to an air lock chamber and includes two sets of doors 106, 108 which are operated by piston-cylinder assemblies 110. These doors can be automatically controlled so that when one door is open the other door is always closed to prevent the escape of abrasive or other flying debris from the blast cleaning area 18. Thus when door 108 at the exit side of vestibule 16 is closed to seal off the blast cabinet, door 106 can be opened whereby a trolley can enter the vestibule. When the trolley is in the vestibule, door 106 is closed and the door 108 can be opened to permit the trolley to enter the cleaning area. The opening and closing of doors 106, 108 can be controlled at control panel 112. Consequently, the trolley can be programmed automatically through the doors without touching them, thus permitting the use of heavier, tighter fitting abrasive retaining doors.

In accordance with another aspect of this invention, the blast wheels or blast nozzles in the treating area are vertically adjustable. FIG. 8, for example, shows an arrangement wherein each blast wheel 20 is mounted upon a sliding plate 114 which overlaps upper seal plate 116 and lower seal plate 118. Each seal plate 116, 118 terminates at its sides in U-shaped flanges 117 (FIG. 9) so that intermediate plate 114 can slide in the flanges and thus can be vertically adjusted by any suitable means such as hydraulic or air cylinder 120. Intermediate plate 114 is made sufficiently long so that in its extreme upward and downward positions plate 114 still overlaps plates 116 and 118 so that an effective labyrinth seal is obtained for the blast cabinet 18.

When the trolley 10 is in the treating area, it is advantageously driven in a translatory direction by, for example, drag chain 122, as shown in FIGS. 11-15. Before this can be done, however, it is necessary to completely disengage or inactivate power drive 26 of the trolley so that the trolley is free to move to and fro or even pause, without damage to or interference from drive motor 26. It is therefore desirable to disengage drive 26 at the beginning of treatment, maintain it disengaged during treatment, and re-engage the drive at the end of the treatment. This is accomplished by the provision of switch 124 (FIG. 4) which is disposed for contacting the cam 64 (FIG. 1) in the treating area which is used to actuate rotation switch 58 (FIG. 4). If desired, of course, separate cams may be provided for the switches. Switch 124 first contacts cam 64 at position 126 (FIG. 15) of the treating area to disengage motor 26 by for example disengaging both clutch 32 and brake 34. Simultaneously, trolley 10 is coupled to drag chain 122 (as later described) so that the movement of drag chain 122 completely controls the movement of trolley 10. When trolley 10 reaches position 128 (FIG. 15) the trolley and drag chain are disengaged, and switch 124 simultaneously rides off cam 64 to re-engage motor 26 so that the trolley proceeds to the next station under its own power.

Figure 15:
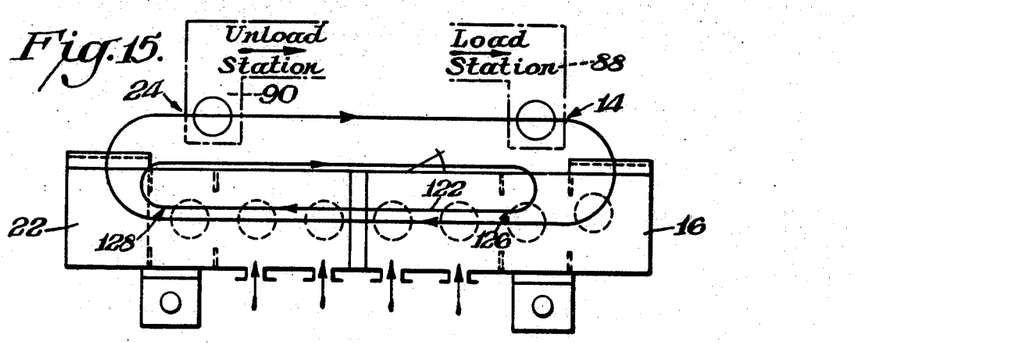
FIGS. 15–20 are schematic views of various ramifications of this invention.

As is apparent from FIG. 15 by utilizing the drag chain arrangement 122, trolley 10 can be moved in front of the blast wheels, back and forth to various positions in the treating area, held in a stationary position at predetermined stations of the treating area, or manipulated at any other desired manner for optimum treating or cleaning. In a multiple station machine, trolley 10 would be moved at a high speed between the stations.

Figure 12:
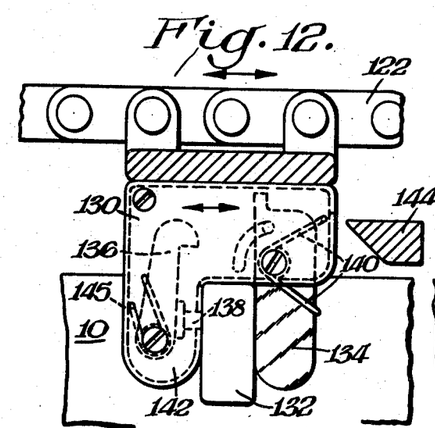
FIG. 12 is an enlarged plan view partially in section of the coupling means for the drag chain trolley shown in FIG. 11 in one phase of operation.
Figure 13:
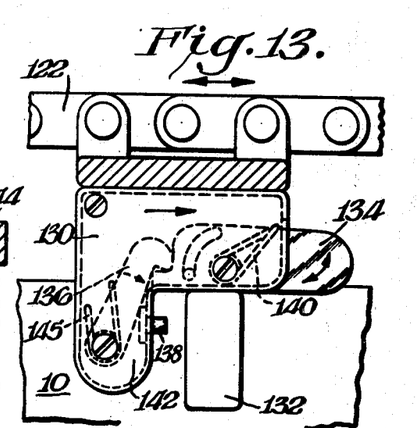
FIG. 13 is an enlarged plan view similar to FIG. 12 in a different phase of operation.
Figure 14:
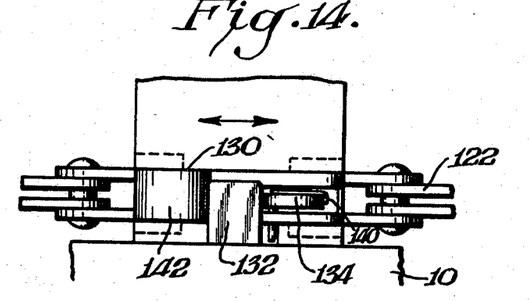
FIG. 14 is a front elevational view of the coupling means of FIG. 12.

FIGS. 11-14 show one example of the coupling means for drag chain 122 and trolley 10, which utilizes drag chain dog 130 and trolley dog 132. FIG. 13 shows the position of drag chain dog 130 and trolley dog 132 immediately before the dogs are coupled. As indicated therein pivotable clamping member 134 of dog 130 is held in a latched position by locking pawl 136 biased by spring 145. In the position indicated in FIG. 13 switch 124 (FIG. 4) has just contacted cam 64 in the treating area 18 so that trolley 10 and its dog 132 are stationary. Drag chain 122 however moves its dog 130 in the direction indicated by the arrow in FIG. 13. As drag chain 122 is continued to be moved in this direction, trolley dog 132 contacts slide pin 138 which in turn rotates pawl 136 counter clockwise to release clamping member 134. Clamping member 134 is in turn biased in a clockwise direction by spring 140 so that the release clamping member 134 rotates against dog 132 to firmly clamp dog 132 between clamping member 134 and offset member 142 as indicated in FIG. 12. Trolley 10 and drag chain 122 are thus effectively locked together so that the movement of trolley 10 is completely determined by the movement of drag chain 122.

For uncoupling drag chain 122 and trolley 10, an unlatching cam 144 is disposed at the end of the treating area as also indicated in FIG. 12. When drag chain dog 130 is moved toward cam 144, the cam contacts locking member 134 to rotate the locking member in a counterclockwise direction thus releasing trolley dog 132. In the meantime, switch 124 of trolley 10 has simultaneously come out of contact with its cam 64 and trolley 10 again moves under its own power. As trolley 10 and its dog 132 move away from drag chain dog 130, pin 138 is permitted to move outward to assume the position shown in FIG. 13, since spring 146 has forced pawl 136 to rotate in a clockwise direction for again locking clamping member 134 in the position shown in FIG. 13.

Instead of being powered by a drag chain arrangement within treating area 18, trolley 10 may continue operation under its own individually controlled direct current drive. Thus, for example, by deactivating switch 36, stops 40 will have no effect on the forward travel of trolley 10. It is thereby possible to electronically program monorail trolley 10 within treating area 18. In this respect, track 12 could be divided into different sections, with each section being individually controlled from an electronic programmer.

Figure 17:
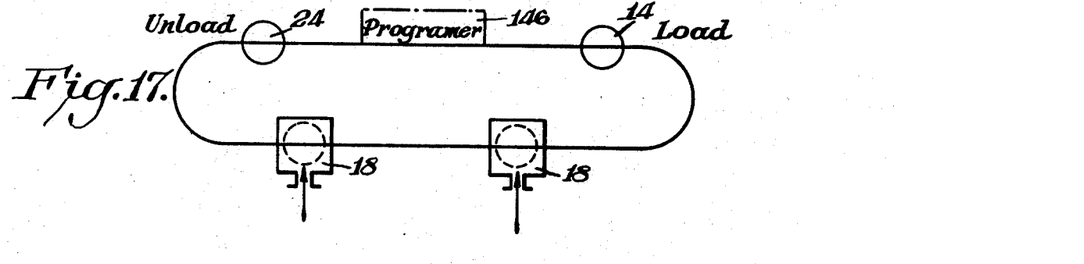

The provision of vertically adjustable blast wheels or nozzles, the adjustable rotatable speed of work hook 66, the utilization of drag chain or other drive means for the treating area, the control of the vestibule doors, the automatic loading and unloading, and the other adjustable features, make possible the use of programming to attain an unusually high degree of control of the workpiece. Thus, for example, a blast wheel could be in a position that would coincide with a pause of the trolley. This makes it possible to apply optimum blast at a spot or area that is hard to clean. FIG. 17 for example schematically illustrates the inclusion of a programmer or numerical control device 146 to coordinate the various features indicated above. In practice, the various controls might be accomplished through a control panel such as indicated at 112 in FIGS. 8 and 10.

Figure 18:
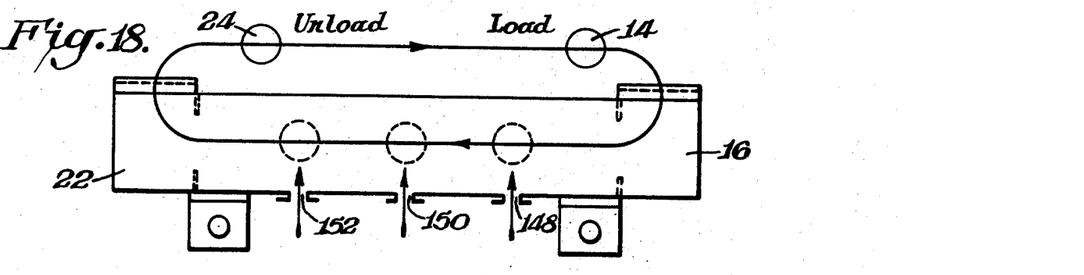

Trolley 10 can be arranged to stop and dwell at a plurality of different points by providing appropriate stops such as stop mechanisms 40 of FIG. 1, to halt the forward movement of the trolley. For example, with reference to FIG. 18 the trolley can stop at load station, then move into vestibule 16. It can then dwell in vestibule 16 while an automatic door of the blast treating area is opened. The trolley can then be successively moved and stopped at treating stations 148, 150, and 152 as well as being moved back and forth with varying speed at these stations. The trolley can then temporarily dwell at station 152 until an automatic door for vestibule 22 is opened, and can dwell in vestibule 22 until the exit door of the vestibule is open whereupon the trolley can be conveyed to unload station 24 and be stopped for automatic unloading. These various movements can of course be controlled through programming.

Figure 16:
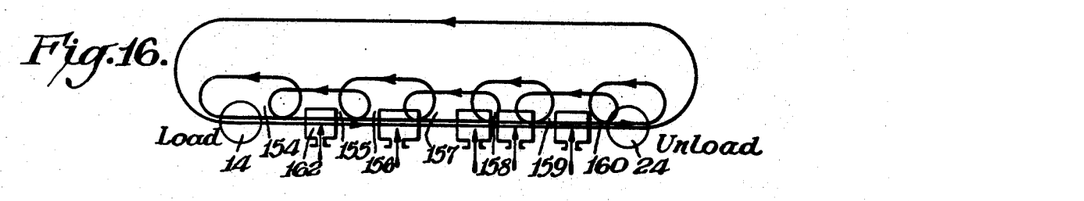

Although the trolleys have been illustrated in FIGS. 2-4 as being driven by electric motors, other individual drive means can be utilized without departing from the spirit of the invention. For example, as illustrated in FIG. 16, a series of drag chains 154-160 can be provided to move the trolleys from station to station at for example varying speeds. Thus, for example, drag chain 154 can move the trolley from load station 14 at a high speed until the trolley is transferred to drag chain 155. Drag chain 155 then moves to the trolley at an appropriate speed in treating station 162. The other drag chains 156-159 can then move the trolley to the various stations at any desired speed until the trolley is finally moved by drag chain 160 to unload station 24.

Instead of providing a series of drag chains as indicated in FIG. 16, a series of hydraulic or pneumatic cylinder actuated indexing mechanisms could be utilized to move the trolley from station to station.

Figure 19:
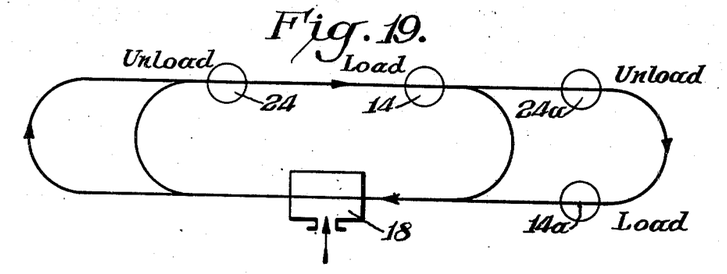
Figure 20:
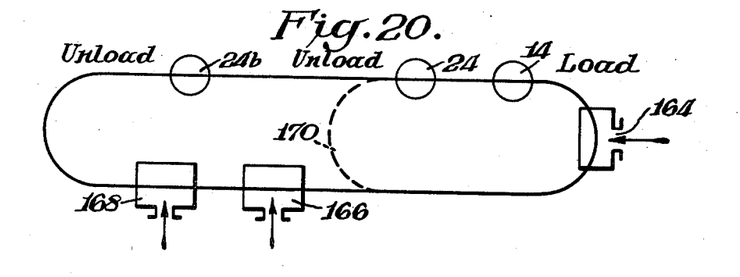

The use of individual trolleys also renders the system capable of incorporating different monorail tracks or loops with appropriate track switches in the system as indicated for example in FIGS. 19-20. Thus, as shown in FIG. 19 different trolleys can be used simultaneously to carry different types of workpieces to the blast machine 18 since different workpieces might require a different hook design. For example, one type of trolley can be used for receiving a certain type of workpiece at load station 14. The workpiece could then be conveyed through blast cleaning area 18 and unloaded at station 24. Additionally, a different trolley could be used to receive another type of workpiece at load station 14a and then convey the workpiece through the blast station 18 where it is unloaded at station 24a.

FIG. 20 shows another utilization of plural track loops. This arrangement includes a plurality of treating stations 164, 166, 168. In this arrangement the same trolleys could be used to carry the work through different treating operations (other than blast cleaning) in the same plant along a common monorail. For example, the work could be loaded at station 14, conveyed through treating area 164 and then directly to unload station 24 over loop 170. Alternatively, the work could be loaded at load station 14 conveyed through area 164 and then conveyed through treating areas 166 and 168 with the work being unloaded at station 24b.

The plural loops have a further advantage in that a trolley needing maintenance could be readily switched out of a main loop to a repair station at a secondary loop without stopping the operation of the remaining trolleys.

The control of the trolleys through these loops can, of course, also be accomplished through programming.

Figure 21:
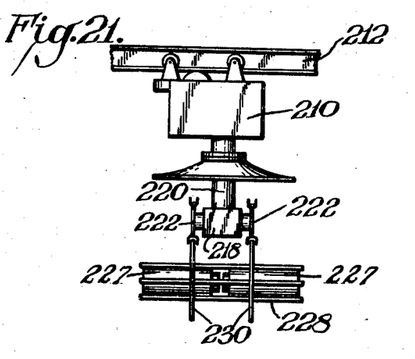
FIGS. 21–24 are elevational views of still further modifications of this invention.
Figure 22:
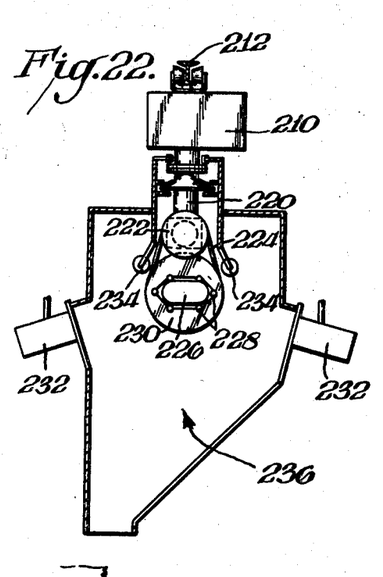
Figures 23, 24:
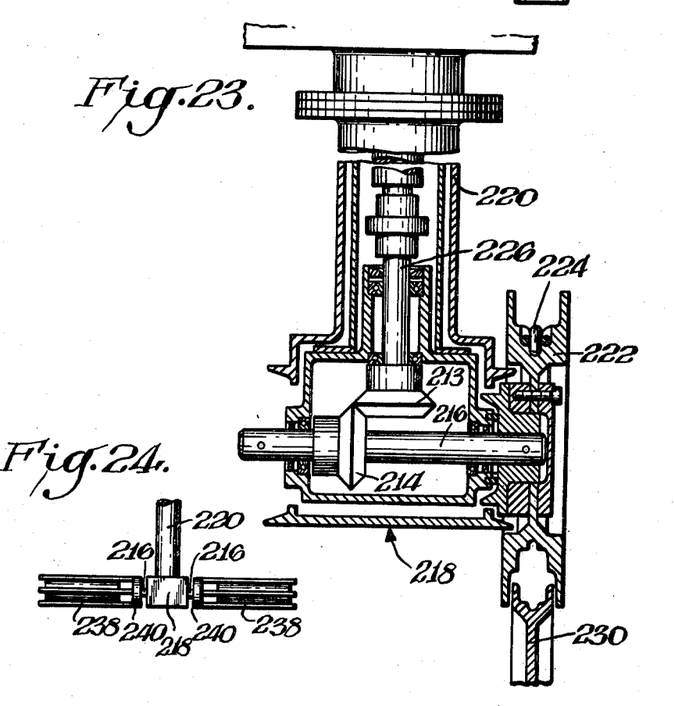

FIGS. 21-23 show a still further advantageous embodiment of this invention. This embodiment enables the work to be rotated in a horizontal plane. As indicated therein trolley 210 rides on track 212 in, for example, a manner similar to trolley 10 of FIG. 2. Drive shaft 226 is also rotated about a vertical axis in the manner of work hook 66 of FIG. 2. At the end of drive shaft 226, however, a bevel gear 213 is provided which drives bevel gear 214 secured to shaft 216. Gears 213 and 214 are housed in gear box 218, while the upper portion of box 218 and work hook 266 are housed in enclosure 220. Thus the gears and work hook are shielded by wear-resistant housings 218, 220. As shown in FIG. 21 a sprocket or pulley 222 is secured to each end of shaft 216 for driving a chain such as logging chain 224 (FIGS. 22-23). The workpieces 227 are inserted in slatted cages or baskets 228 which are open at both ends for loading and unloading and which have enlarged circular flanges 230 secured thereto. As shown in FIG. 22 chain 224 rides around bifurcated flanges 230 to cause the baskets 228 to rotate, thus rotating workpieces 227 about a horizontal axis. This type of rotation is particularly desirable for cleaning work such as automobile heads, intake manifolds, etc. The advantage of this type of rotation is that all of the blast stream from blast wheels 232 (FIG. 22) hits the workpieces (except for the gaps between the work). Additionally by utilizing the various aforedescribed features incorporated in trolley 10, it is possible to get area discrimination as described for the vertical rotation.

The arrangement shown in FIGS. 21-23 include a number of safeguards to stabilize the workpiece mounting. For example, as shown in FIG. 23, circular flange 230 fits within the groove or lips of sprocket 222. This takes up any forward thrust to eliminate creeping or sliding of basket 228. Additionally as shown in FIG. 22 a plurality of opposed wheels or rollers 234 are provided in treating or blast chamber 236 to minimize sideward swaying of basket 228.

A variation of the horizontally rotating workpiece means is shown in FIG. 24. This embodiment also includes housings 218 and 220 for the vertically rotating work hook and the pair of bevelled gears, as well as horizontally rotating shaft 216 which projects from both sides of gear box 214. In the embodiment shown in FIG. 24, however, a basket or cage 238 is mounted directly on each end of shaft 216. This may be done, for example, by having the baskets 238 open at one end for loading and unloading, and closed at the other end by end plate 240. End plate 240 is in turn mounted on shaft 216 by any suitable means.

Obviously, many modifications and variations of the present invention are possible in the light of the above teachings. It is therefore to be understood that within the appended claims the invention may be practiced otherwise than as specifically described.

What is claimed is:

1. A workpiece conveyor for conveying a workpiece along a track in a treating area comprising a trolley, guide wheels on said trolley for riding on the track, a drive wheel on said trolley for riding against the track, motor means connected for operative engagement with said drive wheel to move said trolley in a translatory direction along the track, exposed translatory switch means connected to said trolley for controlling the operative engagement of said motor means with said drive wheel, a workpiece holder connected to said trolley, plural speed rotation means on said trolley for causing said workpiece holder to rotate at different speds, said plural speed rotation means including a rotatable speed selection cam, exposed rotational switch means connected to said trolley for initiating the rotation of said speed selection cam, and a speed selection switch riding against said cam and connected to said motor means for controlling the speed of rotation of said workpiece holder.

2. A conveyor as set forth in claim 1 wherein said translatory switch means includes a bumper switch.

3. A conveyor as set forth in claim 1 wherein said workpiece holder includes a vertical shaft connected to said trolley, a vertical sleeve telescoped over said shaft, a workpiece clamp secured to said sleeve, and vertical drive means connecting said sleeve to said trolley for adjusting the vertical positioning of said workpiece clamp.

4. A conveyor as set forth in claim 3 wherein said workpiece clamp includes a stationary clamp arm, a movable clamp arm pivotally connected to said stationary clamp arm, and clamp arm actuating means connected to said stationary clamp arm and to said movable clamp arm to control the movement of said movable clamp arm.

5. A conveyor as set forth in claim 1 wherein said workpiece holder includes a vertical shaft rotationally secured at its upper end to said trolley, a horizontal shaft, rotation transmission means connecting said vertical shaft with said horizontal shaft whereby rotation or said vertical shaft causes said horizontal shaft to rotate about the axis of said horizontal shaft, and workpiece engaging means secured to said horizontal shaft.

6. A conveyor as set forth in claim 5 wherein said workpiece engaging means includes a slatted work cage for controlling the orientation of the workpiece during its rotation.

7. A workpiece conveying system comprising in combination therewith, an overhead track, a plurality of stations disposed along said track, a trolley suspended from said track, a drive wheel on said trolley riding against said track, motor means connected for operative engagement with said drive wheel to move said trolley in a translatory direction along said track, actuating means in at least one of said stations, exposed translatory switch means connected to said trolley disposed for contact by said actuating means for controlling the operative engagement of said motor means with said drive wheel, a workpiece holder connected to said trolley, plural speed rotation means on said trolley for causing said workpiece holder to rotate at different speeds, said plural speed rotation means including a rotatable speed selection cam, exposed rotational switch means connected to said trolley disposed for contact by said actuating means for initiating the rotation of said speed selection cam, and a speed selection switch riding against said cam and connected to said motor means for controlling the speed of rotation of said workpiece holder.

8. A conveying system as set forth in claim 7 wherein said actuating means includes a retractable stop at said station for contacting said exposed translatory switch means, and timer means connected to said stop to move said stop out of contact with said exposed translatory switch means after a predetermined amount of time.

9. A conveying system as set forth in claim 7 wherein said actuating means includes a camming surface in said station for contacting said exposed rotational switch means to begin the rotation of said holder, and preset switch and cam means being on said trolley and on said holder for halting the rotation of said holder at a predetermined position of said holder.

10. A conveying system as set forth in claim 7 wherein guide plates are in said station, and guide rollers being on said trolley disposed for riding against said guide plates to minimize lateral swaying of said workpiece holder.

11. A conveying system as set forth in claim 7 wherein said workpiece holder includes a vertical shaft connected to said trolley, a vertical sleeve telescoped over said shaft, a workpiece clamp secured to said sleeve, and vertical drive means connecting said sleeve to said trolley for adjusting the vertical positioning of said workpiece clamp.

12. A conveying system as set forth in claim 11 wherein said workpiece clamp includes a stationary clamp arm, a movable clamp arm pivotally connected to said stationary clamp arm, and clamp arm actuating means connected to said stationary clamp arm and to said movable clamp arm to control the movement of said movable clamp arm.

13. A conveying system as set forth in claim 7 wherein said workpiece holder includes a vertical shaft rotationally secured at its upper end to said trolley, a horizontal shaft, rotation transmission means connecting said vertical shaft with said horizontal shaft whereby rotation of said vertical shaft causes said horizontal shaft to rotate about the axis of said horizontal shaft, and workpiece engaging means secured to said horizontal shaft.

14. A conveying system as set forth in claim 13 wherein said workpiece engaging means includes a slatted work cage for controlling the orientation of the workpiece during its rotation.

15. A conveying system as set forth in claim 7 wherein a camming surface is in said station, a disengaging switch being on said trolley disposed for riding against said camming surface to inactivate said motor means, a drag chain being located along said treating station, and engaging means on said drag chain and on said trolley whereby said drag chain may move said trolley through said station.

16. A conveying system as set forth in claim 15 wherein said engaging means includes a drag chain dog and a pivoted clamp on said drag chain, a dog on said trolley, and coupling means activated by said trolley dog for locking said trolley dog between said drag chain dog and said pivoted clamp when said motor means is inactivated.

References Cited

UNITED STATES PATENTS

| | | | |
|---|---|---|---|
| 1,490,125 | 4/1924 | O'Leary | 310—21 |
| 2,168,986 | 8/1939 | Harris | 105—153 |
| 2,291,971 | 8/1942 | Lienau et al. | 105—150 XR |
| 2,317,689 | 4/1943 | Medenwald | 105—153 |
| 2,553,378 | 5/1951 | Miller | 105—148 XR |
| 2,730,047 | 1/1956 | Rollings | 105—153 |
| 2,845,034 | 7/1958 | Harrison | 104—91 XR |
| 3,246,609 | 4/1966 | Westfall | 105—145 |

ARTHUR L. LA POINT, Primary Examiner

H. BELTRAN, Assistant Examiner

U.S. Cl. X.R.

51—14, 15; 104—89, 91; 105—30, 148, 153, 154, 156, 242; 118—324; 198—38, 177